United States Patent
Schroder et al.

(10) Patent No.: US 8,928,578 B2
(45) Date of Patent: Jan. 6, 2015

(54) CURSOR ADJUSTMENT IN AMBIENT LIGHT

(75) Inventors: Manuel Alexander Schroder, Dresden (DE); Michael H. LaManna, Bothell, WA (US)

(73) Assignee: Microsoft Corporation, Redmond, WA (US)

( * ) Notice: Subject to any disclaimer, the term of this patent is extended or adjusted under 35 U.S.C. 154(b) by 954 days.

(21) Appl. No.: 12/432,439

(22) Filed: Apr. 29, 2009

(65) Prior Publication Data

US 2010/0281434 A1 Nov. 4, 2010

(51) Int. Cl.
*G09G 5/00* (2006.01)
*G09G 5/08* (2006.01)
*G06F 3/0481* (2013.01)

(52) U.S. Cl.
CPC .............. *G09G 5/08* (2013.01); *G06F 3/04812* (2013.01); *G09G 2320/066* (2013.01); *G09G 2340/14* (2013.01); *G09G 2360/144* (2013.01)
USPC ......................................................... 345/156

(58) Field of Classification Search
None
See application file for complete search history.

(56) References Cited

U.S. PATENT DOCUMENTS

| | | | |
|---|---|---|---|
| 5,442,736 A * | 8/1995 | Cummins ...................... | 345/622 |
| 5,473,343 A * | 12/1995 | Kimmich et al. ............. | 715/860 |
| 5,969,708 A * | 10/1999 | Walls ............................ | 715/857 |
| 6,597,383 B1 | 7/2003 | Saito | |
| 7,142,192 B2 | 11/2006 | De Waal | |
| 7,295,186 B2 | 11/2007 | Brosnan | |
| 7,847,787 B1 * | 12/2010 | Boillot et al. ................. | 345/156 |
| 2002/0063740 A1 * | 5/2002 | Forlenza et al. .............. | 345/856 |
| 2002/0130838 A1 * | 9/2002 | Feierbach ...................... | 345/157 |
| 2003/0034439 A1 * | 2/2003 | Reime et al. .................. | 250/221 |
| 2004/0113888 A1 * | 6/2004 | De Waal ........................ | 345/157 |
| 2004/0135825 A1 * | 7/2004 | Brosnan ......................... | 345/857 |
| 2005/0051708 A1 * | 3/2005 | Hotelling ................. | 250/214 AL |
| 2006/0095867 A1 | 5/2006 | Rogalski et al. | |
| 2006/0132447 A1 * | 6/2006 | Conrad .......................... | 345/168 |
| 2006/0139312 A1 | 6/2006 | Sinclair et al. | |
| 2006/0244734 A1 * | 11/2006 | Hill et al. ...................... | 345/173 |
| 2007/0146356 A1 * | 6/2007 | Ladouceur ..................... | 345/207 |
| 2007/0195060 A1 * | 8/2007 | Moscovitch ................... | 345/157 |
| 2008/0055228 A1 * | 3/2008 | Glen .............................. | 345/102 |
| 2008/0218501 A1 * | 9/2008 | Diamond ....................... | 345/207 |
| 2008/0229254 A1 | 9/2008 | Warner | |

(Continued)

OTHER PUBLICATIONS

Infogrip, Inc., Screen Magnifier with Cursor Locator (1-page web brochure), http://www.infogrip.com/product_view.asp?RecordNumber=239, Copyright 2003 Infogrip, Inc.

(Continued)

*Primary Examiner* — Alexander S Beck
*Assistant Examiner* — Kirk Hermann
(74) *Attorney, Agent, or Firm* — John Jardine; Kate Drakos; Micky Minhas

(57) ABSTRACT

A method of assisting discovering a cursor on an electronic display is disclosed. In general, if a cursor moves from one display region to another and there is a difference in ambient light, a cursor adjustment may need to be executed. In another embodiment, the method may look to see if a user is moving the cursor in a fashion to locate the cursor in which case a cursor adjustment should be executed. If three cursor inputs are in successively opposite directions or have opposite acceleration and are received within a brief period of time, the cursor adjustment may be executed.

6 Claims, 9 Drawing Sheets

(56) References Cited

U.S. PATENT DOCUMENTS

| | | | |
|---|---|---|---|
| 2008/0278447 A1* | 11/2008 | Lin | 345/158 |
| 2009/0278828 A1* | 11/2009 | Fletcher et al. | 345/207 |
| 2010/0103172 A1* | 4/2010 | Purdy, Sr. | 345/426 |

OTHER PUBLICATIONS

Avago Technologies, Infrared and Sensing Solutions, Application Reference Guide (20-page web brochure), www.maagtechnic.ch/public/pdf/ev/Infrarot_Sender_Empfaenger/Avago_Infrared_and_Sensing_Solutions_Application_Reference_Guide.pdf, Copyright 2006, Avago Technologies, 5989-4680EN Mar. 8, 2006.

Don Johnston Incorporated, kidTRAC by Clearly Superior (1-page web brochure), http://wvvw.donjohnston.com/products/access_solutions/hardware/kid_trac/index.html, Copyright 2009 Don Johnston Incorporated.

* cited by examiner

CURSOR ADJUSTMENT IN AMBIENT LIGHT

BACKGROUND

This Background is intended to provide the basic context of this patent application and it is not intended to describe a specific problem to be solved.

As computing devices with electronic displays become more and more ubiquitous, they are being used in more and more places by more and more people. However, electronic displays have limits. Ambient light can make displays difficult to read. In addition, applications are written to be displayed individually but users often open multiple applications and the applications often appear on top of each other. Forms may have blanks and filling in the blanks may cause the input location to switch automatically or new windows to open. As a result, trying to locate a cursor can become difficult and usability may be reduced.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A method of assisting locating a cursor on an electronic display is disclosed. In general, if a cursor moves from one display region to another and there is a difference in ambient light, a cursor adjustment may need to be executed. More specifically, a first cursor input may be received at a first time from a cursor where the first cursor input may include obtaining a first starting cursor location at a first beginning cursor time and a first ending cursor location at a first ending cursor time. A second cursor input may be received at a second time from the cursor where the second cursor input may include obtaining a second starting cursor location at a second beginning cursor time and a second ending cursor location at a second ending cursor time. The first cursor input and the second cursor input may be stored in a memory and a review may determine if the first cursor input or second cursor input satisfies a cursor adjustment condition.

The cursor adjustment condition may be a variety of conditions. In one embodiment, ambient light readings may be received from ambient light sensors on a display near display regions. If the first cursor input or second cursor input indicates that a the cursor has moved from the first region to the second region, it may be determined if the first ambient light reading and the second ambient light reading indicate a significant ambient light difference, in which case, a cursor adjustment may be executed.

In another embodiment, the method may look to see if a user is moving the cursor in a fashion to locate the cursor in which case a cursor adjustment should be executed. If three cursor inputs are in successively opposite directions or have opposite acceleration and are received within a brief period of time, the cursor adjustment may be executed.

The cursor adjustment may be one selected from a group including increasing a size of the cursor, changing the brightness of the cursor, causing the cursor to blink, changing the color of the cursor, outlining the cursor, adjusting the contrast of the cursor, having the system move the cursor to the center of the display and adjusting the color balance of the cursor.

SPECIFICATION

Although the following text sets forth a detailed description of numerous different embodiments, it should be understood that the legal scope of the description is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

It should also be understood that, unless a term is expressly defined in this patent using the sentence "As used herein, the term '____' is hereby defined to mean . . . " or a similar sentence, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to in this patent in a manner consistent with a single meaning, that is done for sake of clarity only so as to not confuse the reader, and it is not intended that such claim term by limited, by implication or otherwise, to that single meaning. Finally, unless a claim element is defined by reciting the word "means" and a function without the recital of any structure, it is not intended that the scope of any claim element be interpreted based on the application of 35 U.S.C. §112, sixth paragraph.

Figure 1:
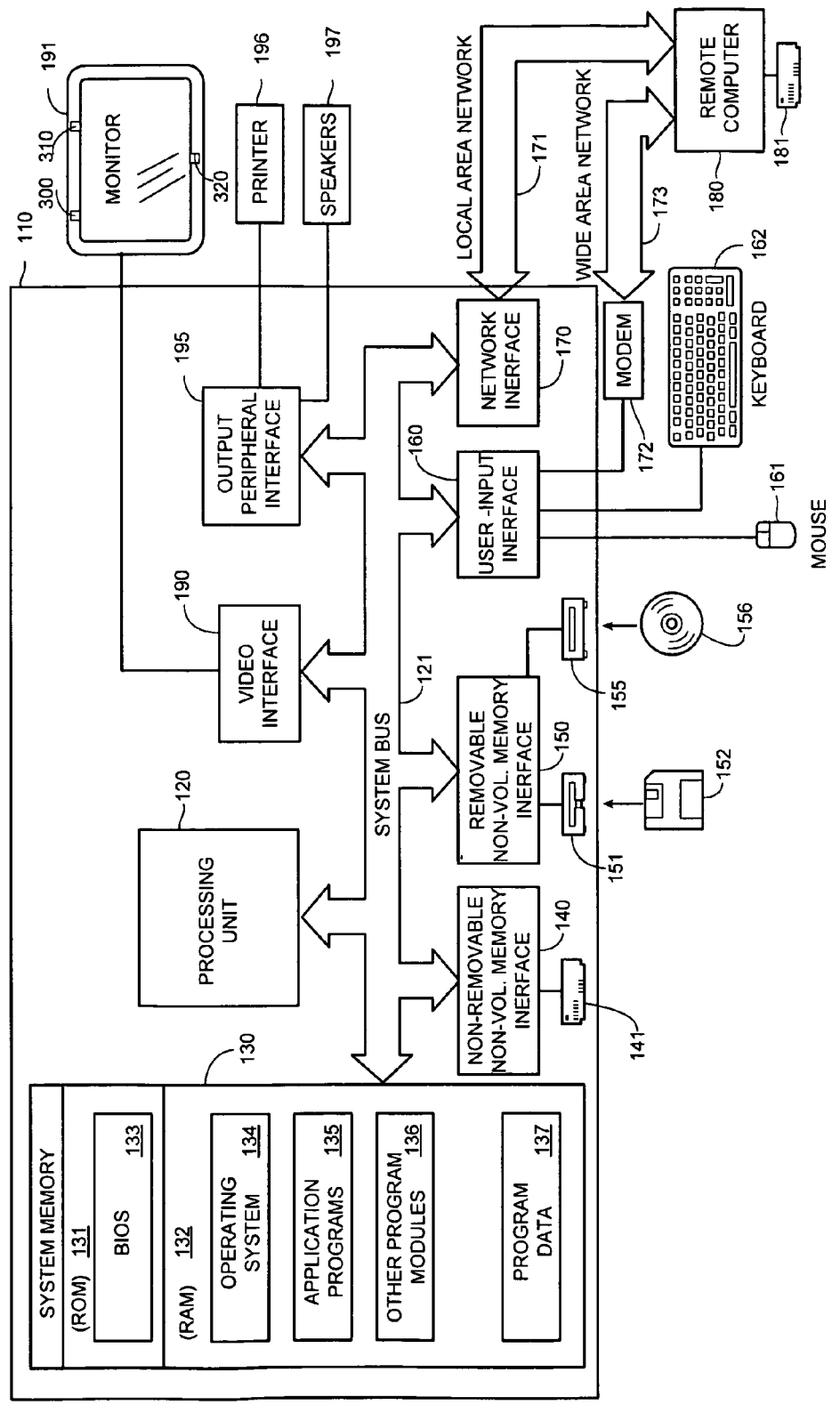
FIG. 1 is an illustration of a portable computing device.

FIG. 1 illustrates an example of a suitable computing system environment 100 that may operate to execute the many embodiments of a method and system described by this specification. It should be noted that the computing system environment 100 is only one example of a suitable computing environment and is not intended to suggest any limitation as to the scope of use or functionality of the method and apparatus of the claims. Neither should the computing environment 100 be interpreted as having any dependency or requirement relating to any one component or combination of components illustrated in the exemplary operating environment 100.

With reference to FIG. 1, an exemplary system for implementing the blocks of the claimed method and apparatus includes a general purpose computing device in the form of a computer 110. Components of computer 110 may include, but are not limited to, a processing unit 120, a system memory 130, and a system bus 121 that couples various system components including the system memory to the processing unit 120.

The computer 110 may operate in a networked environment using logical connections to one or more remote computers, such as a remote computer 180, via a local area network (LAN) 171 and/or a wide area network (WAN) 173 via a modem 172 or other network interface 170.

Computer 110 typically includes a variety of computer readable media that may be any available media that may be accessed by computer 110 and includes both volatile and nonvolatile media, removable and non-removable media. The system memory 130 includes computer storage media in the form of volatile and/or nonvolatile memory such as read only memory (ROM) 131 and random access memory (RAM) 132. The ROM may include a basic input/output system 133 (BIOS). RAM 132 typically contains data and/or program modules that include operating system 134, application programs 135, other program modules 136, and program data 137. The computer 110 may also include other removable/non-removable, volatile/nonvolatile computer storage media such as a hard disk drive 141 a magnetic disk drive 151 that reads from or writes to a magnetic disk 152, and an optical disk drive 155 that reads from or writes to an optical disk 156. The hard disk drive 141, 151, and 155 may interface with system bus 121 via interfaces 140, 150.

A user may enter commands and information into the computer 20 through input devices such as a keyboard 162 and pointing device 161, commonly referred to as a mouse, trackball or touch pad. Other input devices (not illustrated) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device may also be connected to the system bus 121 via an interface, such as a video interface 190. In addition to the monitor, computers may also include other peripheral output devices such as speakers 197 and printer 196, which may be connected through an output peripheral interface 190.

Figure 2:
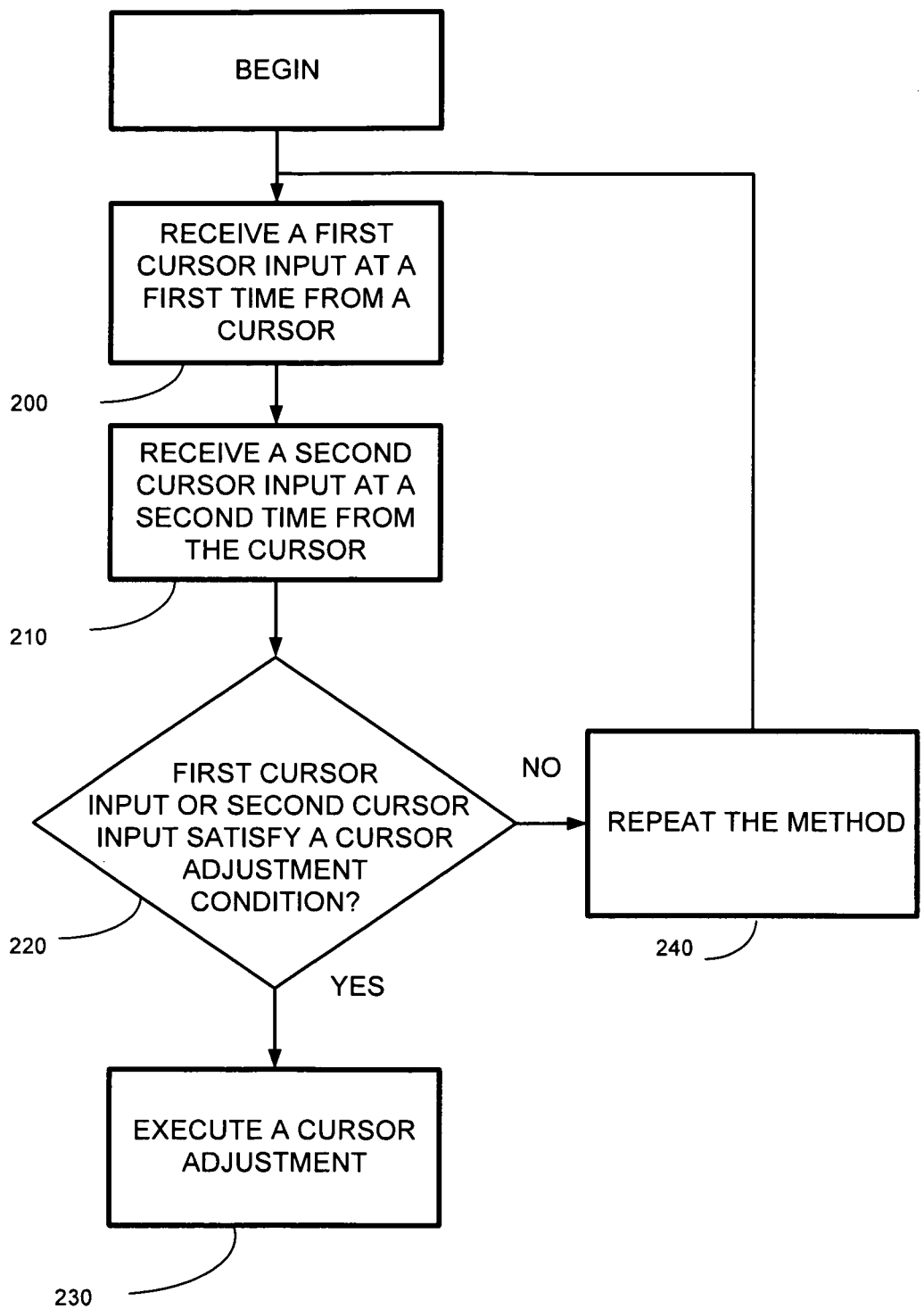
FIG. 2 is an illustration of a method of determining if a cursor adjustment is required.

FIG. 2 illustrates a method of assisting discoverability of a cursor on an electronic display. Oftentimes, when using a computer or a device with an electronic screen, the input location, often indicated by a pointer or a cursor cannot be seen. The lack of a cursor is frustrating to users. The normal response is to wiggle the pointing device, such as a mouse, such that motion may be observed on the electronic display and the cursor can be located.

Another frustration for users is to lose the cursor when moving from an area of low light to an area of bright light. Often, the cursor will be washed out and the cursor will be lost. Somewhat related, a user may move a cursor from a first location that is relatively dark to a second location that is relatively bright. The cursor also may be washed out by the bright light. It would useful to have a method for a computing system to recognize that a cursor is likely lost and that a way to find a cursor on an electronic display should be implemented.

At block 200, a first cursor input 710 (FIG. 7) may be received at a first time from a cursor 700. The first cursor input 710 may include obtaining a first starting cursor location 701 at a first starting cursor time and a first ending cursor location 702 at a first ending cursor time and the first cursor input 710 may be the movement from the first starting location 701 to the first ending location 702 and the time it took to get from the first starting location 701 to the first ending location 702. The time may be calculated, such as comparing the first cursor start time to the first cursor ending time.

Determining the first starting cursor time, first ending cursor time, the first starting cursor position 701 and the first ending cursor position 702 may occur in many ways. In one embodiment, the cursor position is observed periodically. In this embodiment, the first cursor input 710 may review a numerous cursor positions to determine if a continuous movement is occurring, if the cursor 700 has stopped, if the cursor 700 is accelerating, if the cursor 700 is decelerating, etc. A single, logical movement may be considered the first cursor input 710. In another embodiment, the first cursor starting position 701 and the first cursor start time may be the position at which the cursor stops. In yet another embodiment, the first cursor position 701 and first cursor time may be the position and time at which the cursor 710 changes direction. The first ending cursor time and first ending cursor position 702 may be determined in a similar manner. For example, the first ending location 702 may be taken periodically, may be determined when there is a change in direction, a change in acceleration, a stop, etc. In addition, any other reasonable way to determine when a cursor 700 has stopped and started may be possible.

At block 210, a second cursor input 720 may be received at a second time from the cursor 700. The second cursor input 720, like the first cursor input 710, may include obtaining a second starting cursor location 703 at a second starting cursor time and an second ending cursor location 704 at a second ending cursor time. Similar to the first cursor input 710, the second start time, the second start location 703, the second stop time and the second stop location 704 may be determined in a variety of ways, from periodically sampling, to intelligently interpreting the motion of the cursor. Of course, other ways are possible and are contemplated.

At block 220, the first cursor input 710 and the second cursor input 720 may be stored in a memory, such as RAM 132. The memory 132 may be the same memory, a separate memory, a database or any other appropriate storage device such as a hard disk 141, a floppy disk 151, a cd/dvd drive 155, a flash drive, a hybrid flash/rotating media drive, in a cloud, in a peer in a peer to peer network, etc. In some embodiments, the memory 132 may be high speed memory as the data may be generated and analyzed many times a second. Again, virtually any memory 132 will be acceptable.

The first time and the second time may be reviewed. If the second time is more than a threshold time after the first time, the first cursor input may be removed from the memory 132 and the first cursor input 710 may be replaced with the second cursor input 720. In this situation, the input movement does not appear to be fast enough to merit the cursor adjustment.

At block 230, it may be determined if the first cursor input 710 or second cursor input 720 satisfies a cursor adjustment condition. In some embodiments, the determination may be whether the combination of the first cursor input 710 and the second cursor input 720 meet the cursor adjustment condition.

Figure 3:
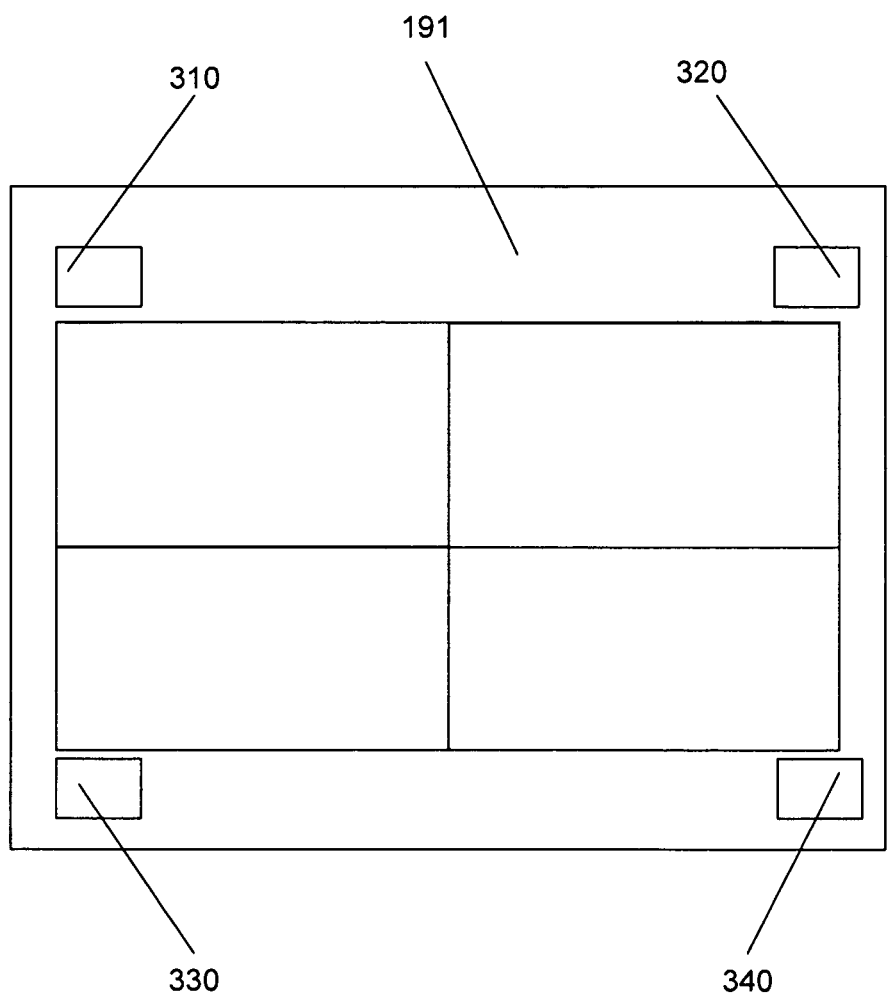
FIG. 3 is an illustration of an electronic display with four ambient light sensors.
Figure 4:
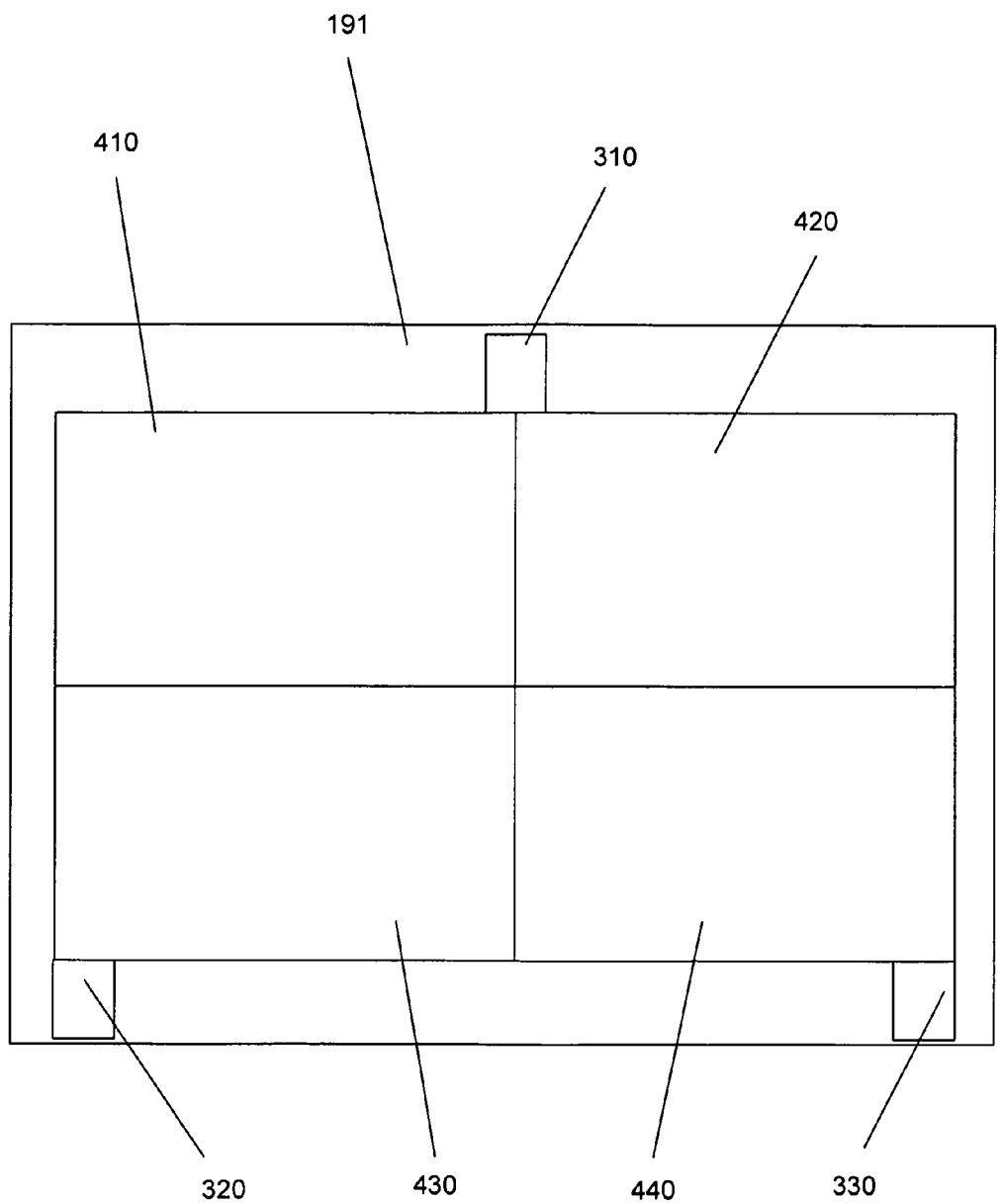
FIG. 4 is an illustration of an electronic display with three ambient light sensors and four display regions.
Figure 5:
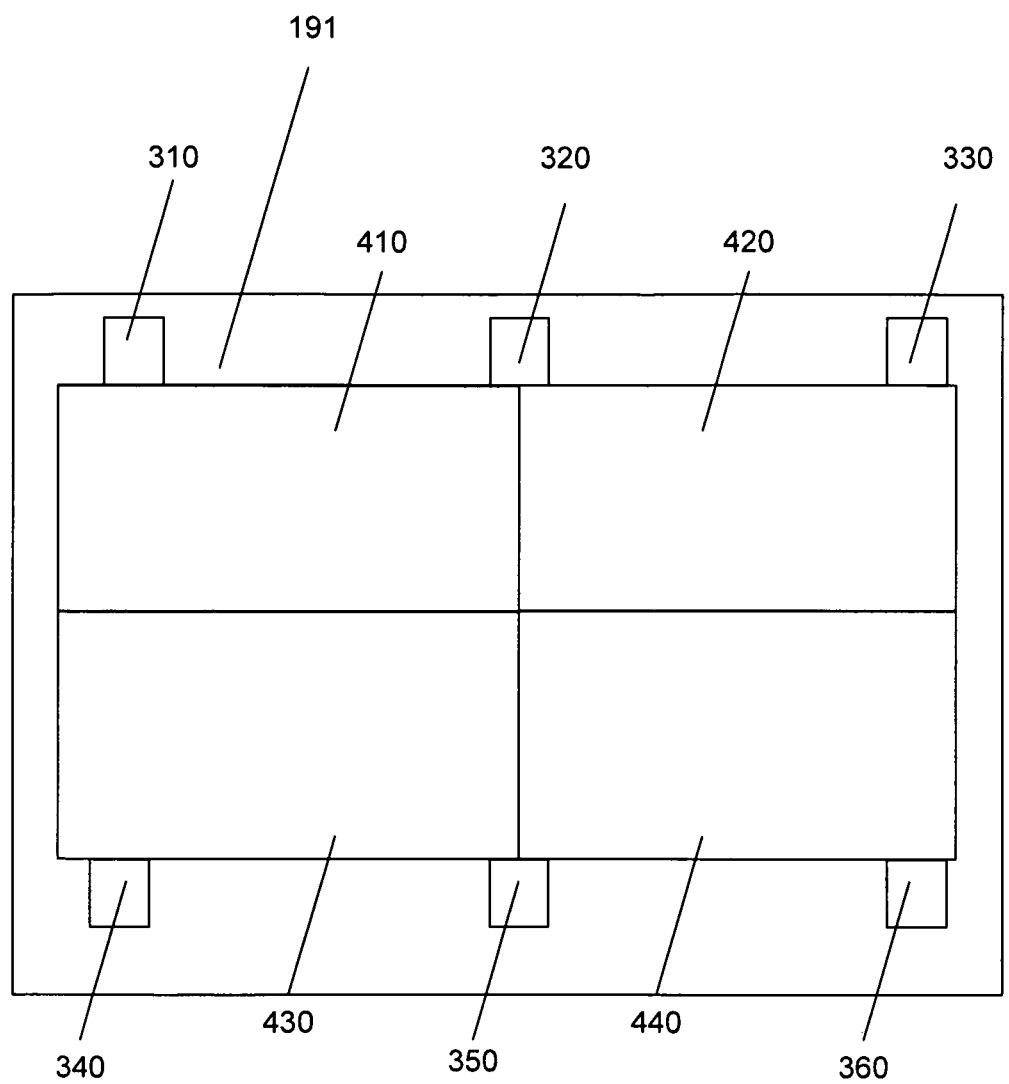
FIG. 5 is an illustration of an electronic display with six ambient light sensors and four display regions.

The cursor adjustment condition may take on a variety of forms. In one embodiment such as illustrated in FIG. 3, an electronic display 191 may have at least two ambient light sensors, or even more. FIG. 3 illustrates that there are four ambient light sensors 310, 320, 330, 340. FIG. 4 illustrates that three ambient light sensors may be used 310 320 330, and by using some mathematical formulas, the display 191 may be broken into for quadrants 410 420 430 440 for brightness purposes. FIG. 5 illustrates six ambient light sensors 310-360, which also can break the display 191 into quadrants or 410-440 or math may be used and the display may be broken down into even more areas.

Figure 6:
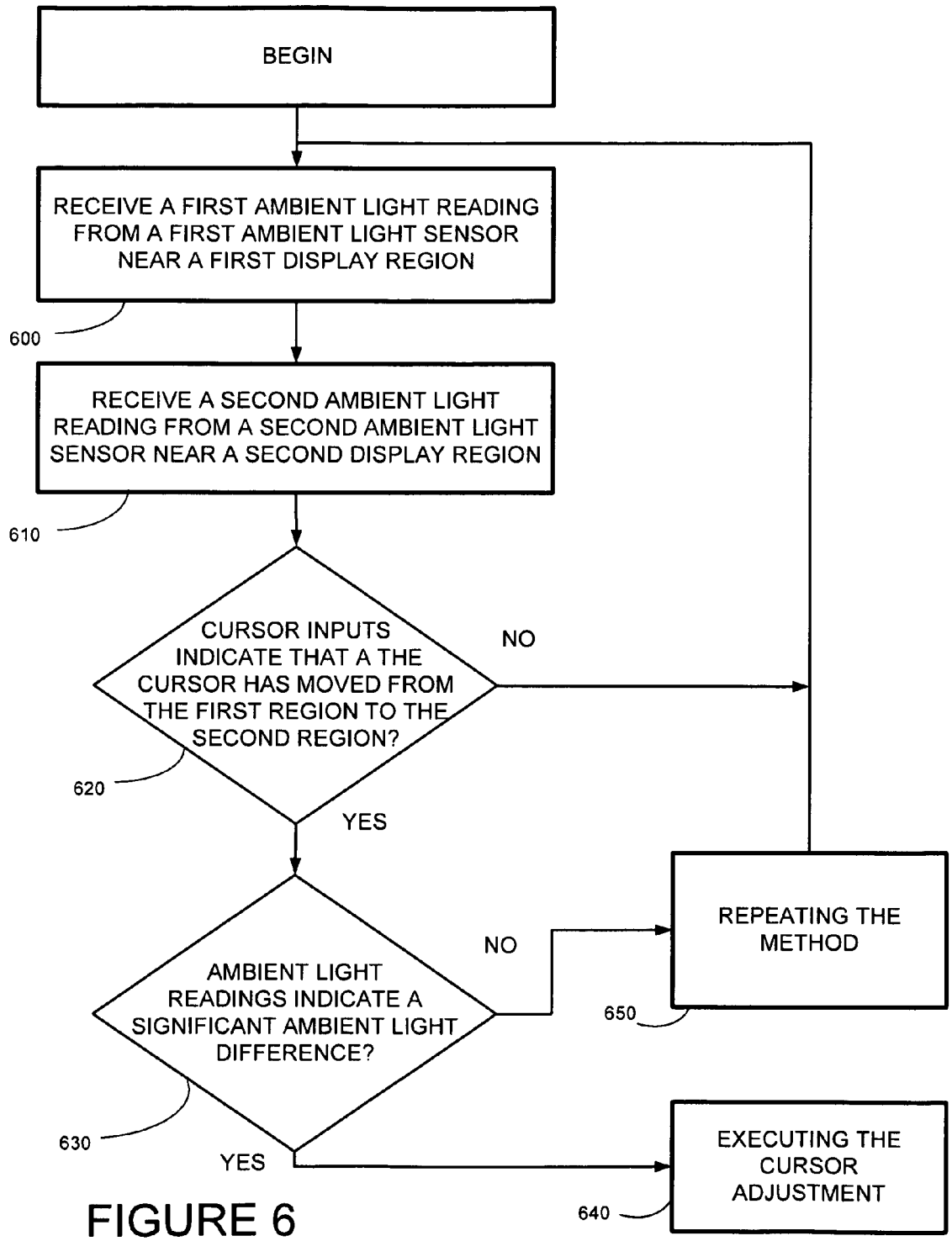
FIG. 6 is a flowchart describing moving a cursor from a first region to a second region and obtaining related ambient light readings to determine if a cursor adjustment is required.

FIG. 6 may illustrate one method of using the ambient light sensors to determine if the cursor adjustment condition has been met. At block 600, a first ambient light reading from a first ambient light sensor 310 near a first display region 410 may be received. Ambient light sensors are known virtually any commercially available light sensor will work. At block 610, a second ambient light reading from a second ambient light sensor 320 near a second display region 420 may be received.

At block 620, it may be determined if the first cursor input 710 or second cursor input 720 indicates that the cursor 700 has moved from the first region 410 to the second region 420. In other words, has the cursor 700 moved from a light area to a dark area or vice versa, in either case, a cursor adjustment 708 would be helpful.

At block 630, it may be determined if the first ambient light reading from the first ambient light sensor 310 and the second ambient light reading from the second ambient light sensor 310 indicate a significant ambient light difference. The difference may be set by the programmer or may be set by a user. In addition, user experience may be used to determine when a light difference is such that a cursor adjustment 708 would be helpful. For example, if a previous light difference was determined to be 20 out of a scale of 100 and the cursor was lost, then 20 may be a significant difference. On the other hand, if the previous light difference was 15 and the cursor was not lost, then a cursor adjustment 708 may not be need if the difference is near 15.

At block 640. if the if the first ambient light reading from the first ambient light sensor 310 and the second ambient light reading from the second ambient light sensor 320 indicate a significant ambient light difference, the cursor adjustment 708 may be executed. The cursor adjustment 708 will be discussed further. At block 650, if the first ambient light reading from the first ambient light sensor 310 and the second ambient light reading from the second light sensor 320 does not indicate a significant ambient light difference, then the method may repeat.

In some embodiments, the differences in the readings from the ambient light sensor 310 320 may be classified and the cursor adjustment 708 may be created in relation to the classification for difference. For example if the light difference is great and the cursor 700 likely will be lost, a more drastic cursor adjustment 708 may occur. In addition, the method may "learn" in that previous experience from moving from different light levels may be used to predict the proper cursor adjustment.

Figure 7:
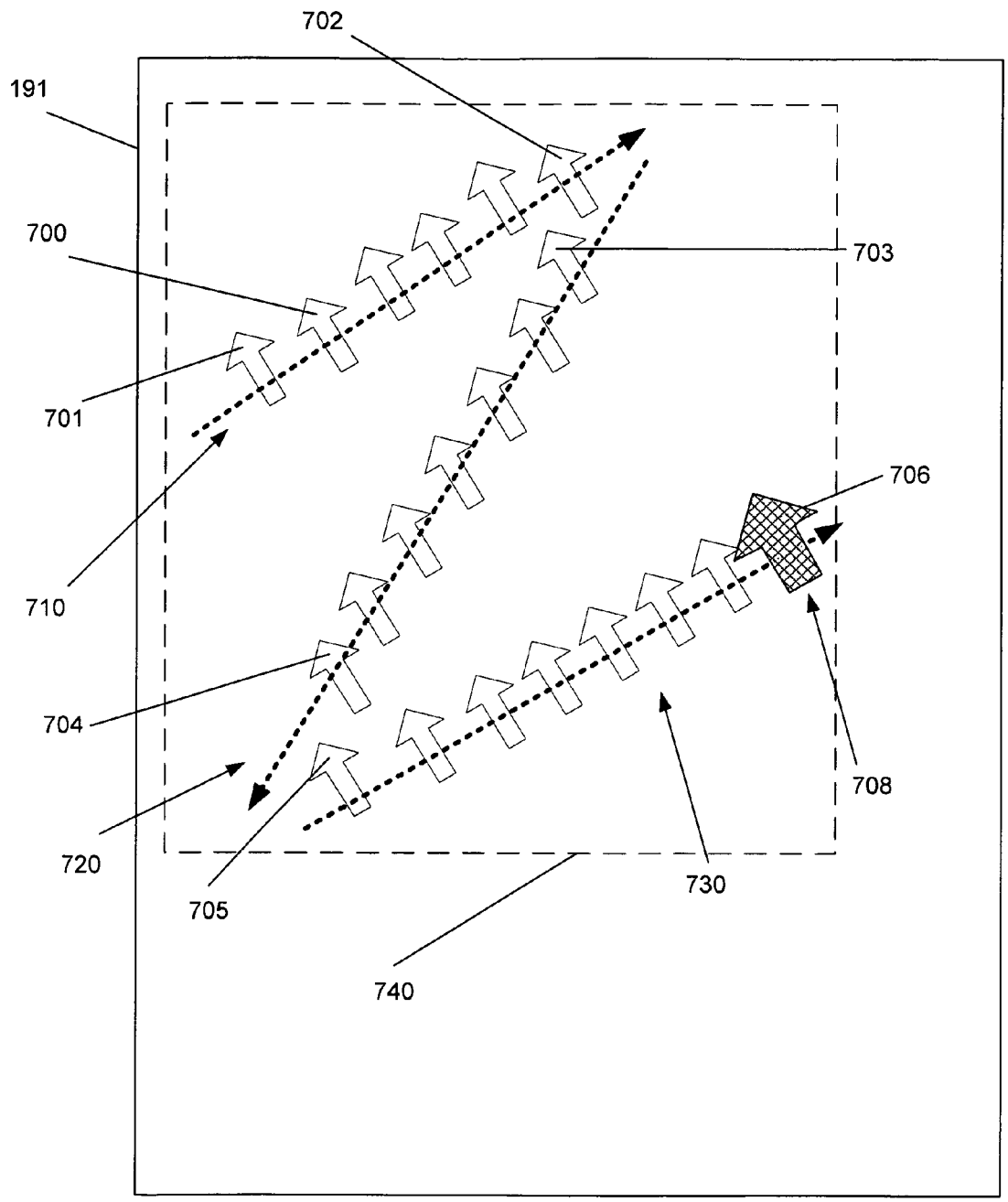
FIG. 7 illustrates a zig-zag or rapid motion would indicate the cursor cannot be found and that a cursor adjustment is required.

FIG. 7 may illustrate another cursor adjustment 708 condition. In general, if the cursor 700 is lost, a user may move the cursor in a zig-zag or back and forth type motion of the first cursor input 710, the second cursor input 720 and the third cursor input 730 in order to see the cursor moving on the electronic display 191. The method tries to attempt to recognize this zig-zag type motion of the first cursor input 710, the second cursor input 720 and the third cursor input 730 and execute cursor adjustment 708 in response. In addition, the method may draw a bounding box 740 around the first cursor starting point and if the cursor moves outside the bounding box 740, the assumption may be that the motion was intended to be a normal movement, not a quick back and forth zig-zag 710 720 730 type motion. In addition, the time in the bounding box may be analyzed. If the time is short, the movement 710 may indicate a violent shaking and a cursor adjustment 708 may be in order where a long time inside the bounding box may indicate a slow approach toward a desired location.

Figure 8:
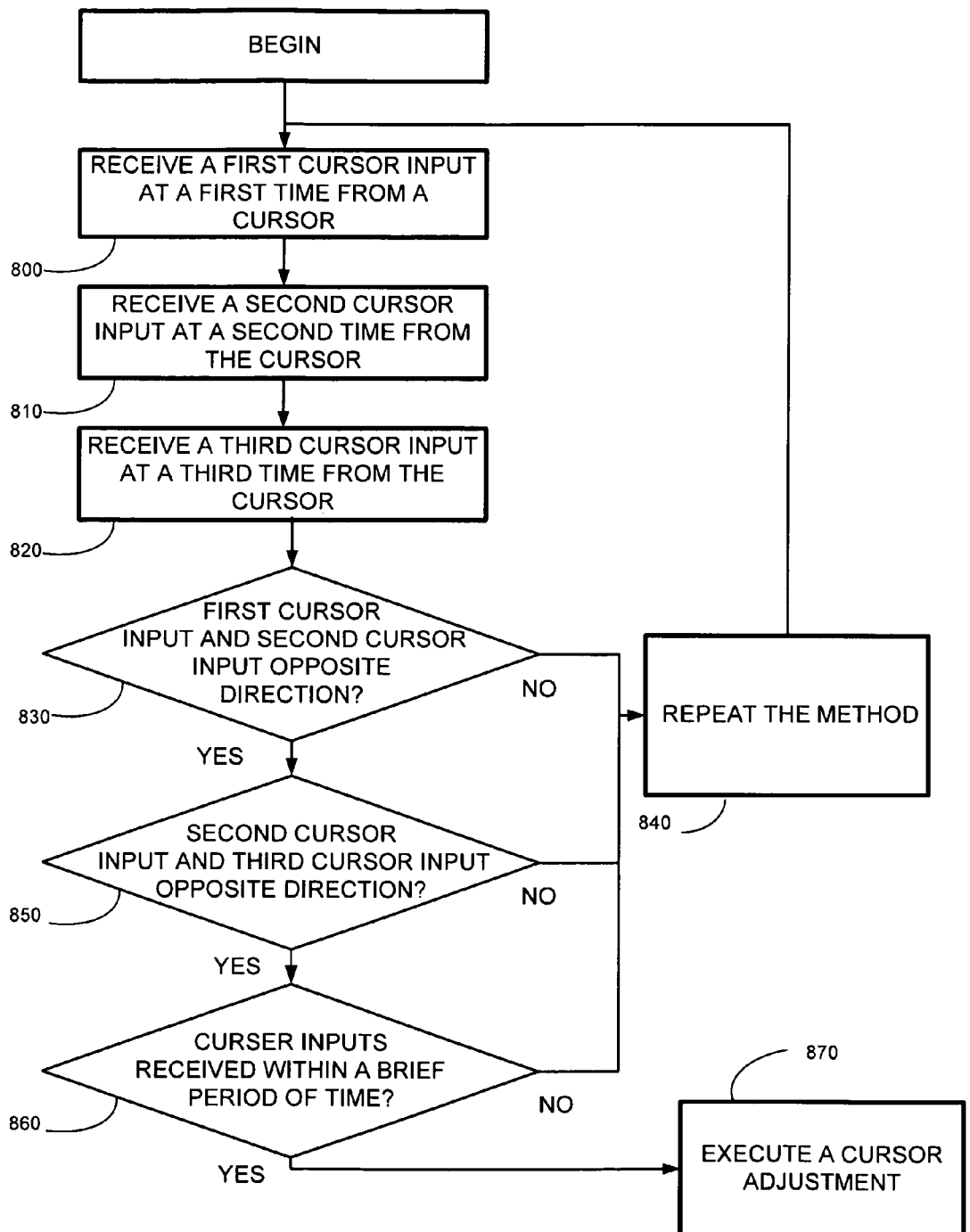
FIG. 8 illustrates a method of determining if the first, second and third directional inputs indicate that a cursor adjustment required.

FIG. 8 may illustrate another cursor adjustment 708 condition. At block 800, a first cursor input 710 is received, at block 810, a second cursor movement 720 is received and at block 820, a third cursor input 730 is received. The third cursor input 730 may be received at a third time from a cursor 700 where the third cursor input 730 comprises obtaining a third staring cursor location 705 at a third cursor time and an third ending cursor location 706 at a third cursor time, similar to the first cursor input 710 and second cursor input 720.

At block 830, it may be determined if the first cursor input 710 and second cursor input 720 are in opposite directions, such as in FIG. 7 (710 and 720). If the first cursor input 710 and second cursor input 720 are not in different directions, the method may be repeated at block 840. If the first cursor input 710 and second cursor input 720 are in opposite directions like cursor input 710 and 720 (FIG. 7), at block 850, it may be determined if the second cursor input 710 and third cursor input 720 are in opposite directions, such as in FIG. 7 (710 and 720). If the second cursor input 720 and third cursor input 730 are not in different directions, the method may be repeated at block 840.

If the second cursor input 720 and third cursor input 730 are in different directions, at block 860, it may be determine if the first cursor input 710, second cursor input 720 and third cursor input 730 were received within a minimum amount of time. If a user is quickly moving the mouse 161, then first cursor input 710, the second cursor input 720 and the third cursor input 730 may be within the minimum time period and at block 870, a cursor adjustment 708 should be executed. If the user is slowly moving the mouse 161 around the display 191, then the cursor adjustment 708 may not be necessary.

Figure 9:
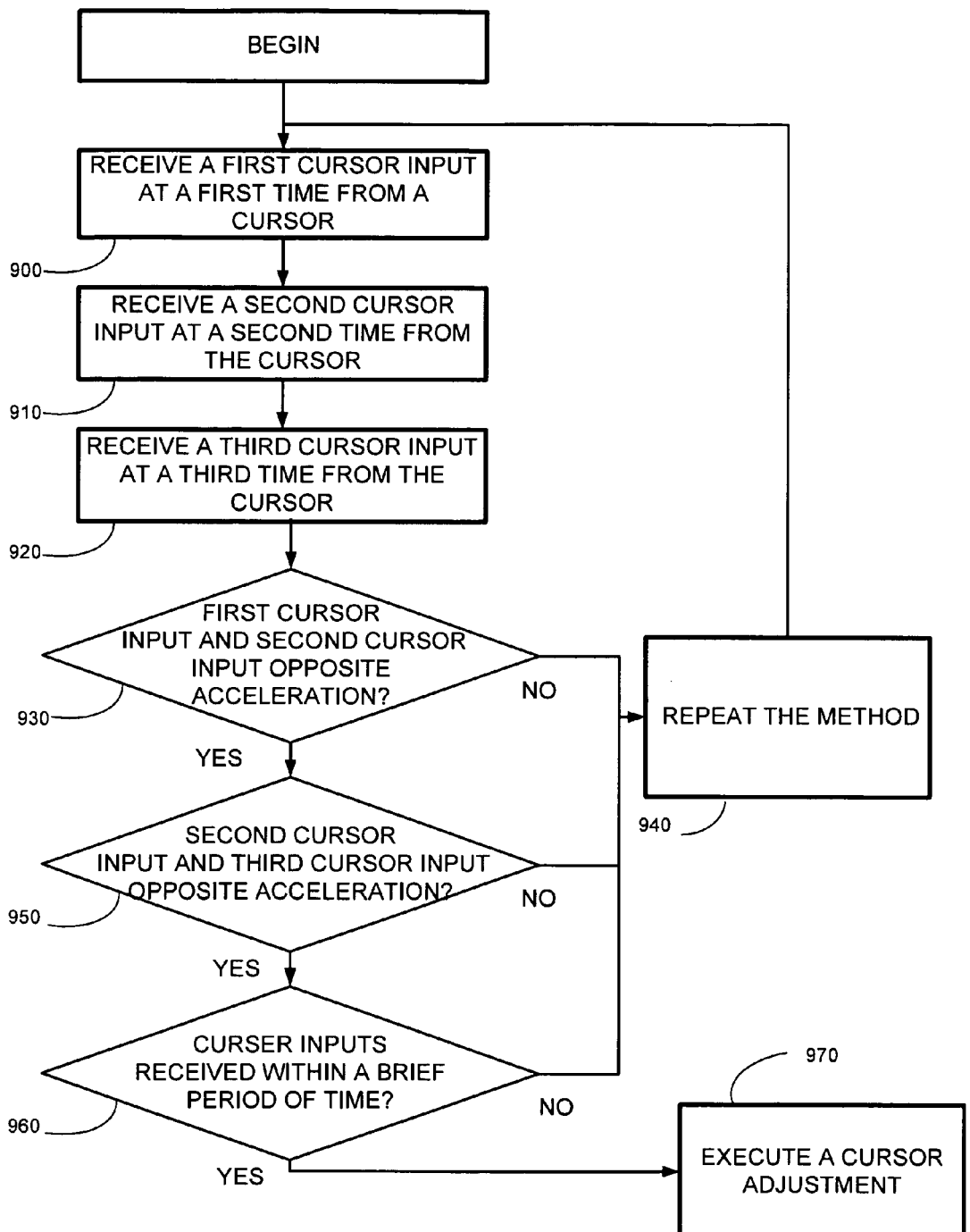
FIG. 9 illustrates a method of determining if the first, second and third acceleration inputs indicate that a cursor adjustment required.

FIG. 9 may illustrate a similar concept, but FIG. 9 illustrates that acceleration may be used instead of direction. The acceleration may be analyzed in the x and y direction. More specifically, block 930, 950 and 960 review the direction of acceleration of the first cursor input 710, the second cursor input 720 and the third cursor input 730 and ensure the acceleration is in opposite directions such as illustrated in FIG. 7. If the acceleration is in opposite directions and is received within a minimum time period, then the cursor adjustment 708 may be executed.

The cursor adjustment 708 may take on many forms to assist discovering the cursor 700. For example, the cursor adjustment 708 may increase size of the cursor 700, changing the brightness of the cursor 700, causing the cursor 700 to blink, changing the color of the cursor 700, outlining the cursor 700, adjusting the contrast of the cursor 700, having the system move the cursor 700 to the center of the display 191 or adjusting the color balance of the cursor 700. Of course, other adjustments are possible and are contemplated. In addition, the cursor adjustment 708 may different levels wherein higher levels execute more extreme cursor adjustments 708 and lower levels execute less extreme cursor adjustments 708.

The cursor adjustment 708 may be removed after a location period. In some embodiments, the location period may be a fixed time, such as ten seconds. In another embodiment, the location period may be set by a user. It yet a further embodiment, previous experience may be used to set the location period, such as how long it took the user to find the cursor in the past. Of course, other location periods are possible and are contemplated.

As a result, discovering and using the cursor 700 may be easier. In addition, the user experience should be improved as hunting for the cursor 700 should be reduced. Less user time, processor usage and memory may result by following various embodiments of the method.

In conclusion, the detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims.

The invention claimed is:

1. A computing device comprising a display, a processor, a storage device, a first light sensor, and a second light sensor, the storage device storing information to cause the processor, when executing, to perform a process comprising:
   receiving a first light reading from the first light sensor, the first light sensor corresponding to a static first display region of the electronic display;
   receiving a second light reading from the second light sensor, the second light sensor corresponding to a static second display region of the electronic display;
   monitoring cursor inputs to determine when a cursor has moved from the first display region to the second display region,
   when determined that the cursor has moved from the first display region to the second display region:
      determining if a difference between the first ambient light reading and the second ambient light reading satisfies a threshold;
      when determined that the difference between first ambient light reading and the second ambient light reading satisfies the threshold, automatically adjusting brightness of the cursor relative to brightness of the display.

2. A computing device according to claim 1, the process further comprising determining a classification for the first ambient light reading and a classification for the second ambient light reading;
   performing the automatically adjusting based on the classifications.

3. A method comprising:
   receiving light readings from a plurality of light sensors arranged in proximity to a display, wherein a computing device performing the method comprises the light sensors and the display displaying a cursor;
   determining locations of the cursor on the display, the cursor being moved to the locations according to user input controlling the cursor;
   as the cursor is moved by the user, according to the determined locations determining when the cursor has moved between a first region of the display and a second region of the display, the first and second regions fixed relative to the display, and when so determined:
      finding a difference between a corresponding light reading for the first region and a corresponding light reading for the second region,
      determining that the difference satisfies a threshold, and in response determining to automatically change a brightness of the cursor.

4. The method of claim 3, further comprising determining classifications for the respective differences, and using the classifications to determine whether to change the brightness of the cursor.

5. The method of claim 3, wherein the changing of the brightness of the cursor is controlled by a user-settable adjustment level.

6. A method of controlling visibility of a cursor displayed on a display, the method comprising:
   receiving first light readings from a first light sensor, receiving second light readings from a second light sensor, receiving third light readings from a third light sensor, and receiving fourth light readings from a fourth light sensor;
   obtaining positions of the cursor to determine when the cursor moves between any of four separate fixed regions of the display, a first region corresponding to the first light readings, a second region corresponding to the second light readings, a third region corresponding to the third light readings, and a fourth region corresponding to the fourth light readings;
   each time it is determined that the cursor has moved from one of the regions to another of the regions, determining from differences in corresponding light readings whether the cursor has moved from a region of brighter ambient light or has moved to a region of darker ambient light; and
   each time that it has been determined that the cursor has moved to a region of darker ambient light, decreasing brightness of the cursor, and each time it has been determined that the cursor has moved to a region of brighter ambient light, increasing brightness of the cursor relative to brightness of the display.

* * * * *